US012573514B2

(12) United States Patent
Robertson et al.

(10) Patent No.: US 12,573,514 B2
(45) Date of Patent: Mar. 10, 2026

(54) INTEGRATED HEAD PACKAGE

(71) Applicant: Rolls-Royce SMR Limited, Derby (GB)

(72) Inventors: Daniel Robertson, Derby (GB); Euan Sharp, Derby (GB); Gerard Halliday, Derby (GB); Stephen Calvert, Derby (GB); Matthew Morris, Derby (GB)

(73) Assignee: Rolls-Royce SMR Limited, Derby (GB)

( * ) Notice: Subject to any disclaimer, the term of this patent is extended or adjusted under 35 U.S.C. 154(b) by 288 days.

(21) Appl. No.: 18/254,110

(22) PCT Filed: Nov. 12, 2021

(86) PCT No.: PCT/EP2021/081546

§ 371 (c)(1),
(2) Date: May 23, 2023

(87) PCT Pub. No.: WO2022/117317

PCT Pub. Date: Jun. 9, 2022

(65) Prior Publication Data

US 2024/0021331 A1 Jan. 18, 2024

(30) Foreign Application Priority Data

Dec. 3, 2020 (GB) ...................................... 2019072

(51) Int. Cl.
*G21C 19/20* (2006.01)
*G21C 7/12* (2006.01)
(Continued)

(52) U.S. Cl.
CPC ......... *G21C 19/207* (2013.01); *G21C 13/073* (2013.01); *G21C 19/32* (2013.01); *G21C 7/12* (2013.01)

(58) Field of Classification Search
CPC .... G21C 13/073; G21C 19/20; G21C 19/202; G21C 19/205; G21C 19/207
See application file for complete search history.

(56) References Cited

U.S. PATENT DOCUMENTS 4,678,623 A * 7/1987 Malandra ............... G21C 15/02
976/DIG. 188
4,830,814 A * 5/1989 Altman .................. G21C 13/06
976/DIG. 175
(Continued)

FOREIGN PATENT DOCUMENTS

EP 0297881 A2 1/1989
GB 1303755 A 1/1973
(Continued)

OTHER PUBLICATIONS

UKIPO Search Report, Application No. GB-2019072.4, dated May 11, 2021, 2 pages.
(Continued)

*Primary Examiner* — Sharon M Davis
(74) *Attorney, Agent, or Firm* — Quarles & Brady LLP

(57) ABSTRACT

The present disclosure provides an integrated head package for a nuclear power generation system, the integrated head package comprising a closure head, and a control rod drive mechanism housed within a shroud. The control rod drive mechanism comprises at least one drive rod extending through the closure head and having a coupling element for releasably coupling to a control rod assembly within a reactor core. The at least one drive rod is movable to a maintenance/refuelling position in which the at least one drive rod is uncoupled from the control rod assembly and at least partially retracted into the integrated head package. The integrated head package further comprises at least one
(Continued)

engagement feature for securing the at least one drive rod in the maintenance/refuelling position.

18 Claims, 2 Drawing Sheets

(51) Int. Cl.

| | |
|---|---|
| ***G21C 13/073*** | (2006.01) |
| ***G21C 19/32*** | (2006.01) |

(56) References Cited

U.S. PATENT DOCUMENTS

| | | | | |
|---|---|---|---|---|
| 5,078,957 | A | 1/1992 | Tower et al. | |
| 5,225,150 | A | 7/1993 | Malandra et al. | |
| 5,384,812 | A | 1/1995 | Meuschke et al. | |
| 5,761,260 | A * | 6/1998 | Bergamaschi | G21C 7/12 376/233 |
| 2007/0140402 | A1 | 6/2007 | Baliga | |
| 2009/0245451 | A1 | 10/2009 | Funkhouser | |
| 2013/0270929 | A1 * | 10/2013 | Goodyear | G01D 5/2033 310/30 |
| 2015/0325318 | A1 | 11/2015 | Singh et al. | |
| 2016/0307652 | A1 | 10/2016 | Arlaud et al. | |
| 2020/0027588 | A1 | 1/2020 | Lobscheid | |

FOREIGN PATENT DOCUMENTS

| | | | |
|---|---|---|---|
| GB | 2251974 | A | 3/1992 |
| JP | S63184093 | A | 7/1988 |
| JP | H0480696 | A | 3/1992 |
| JP | H1078492 | A | 3/1998 |
| JP | 2009174941 | A | 8/2009 |
| WO | WO-2014-025700 | A2 | 2/2014 |
| WO | 2017023368 | A1 | 2/2017 |

OTHER PUBLICATIONS

International Search Report and Written Opinion, International Application No. PCT/EP2021/081546, European Patent Office-Searching Authority, mailed Feb. 4, 2022, 9 pages.

Office Action, corresponding to JP 2023-534020, dated Aug. 7, 2025.

* cited by examiner

INTEGRATED HEAD PACKAGE

RELATED APPLICATIONS

This application is a 35 U.S.C. § 371 national phase application of PCT/EP2021/081546 (WO-2022/117317 A1), filed on Nov. 12, 2021, entitled "INTEGRATED HEAD PACKAGE", and claims priority to GB-2019072.4 filed on Dec. 3, 2020, which is incorporated herein by reference in its entirety.

TECHNICAL FIELD

The present disclosure relates to an integrated head package for a nuclear power generation system; and to a method of performing maintenance and refuelling operations in a nuclear power generation system.

BACKGROUND

Nuclear power plants convert heat energy from the nuclear decay of fissile material contained in fuel assemblies within a reactor core into electrical energy. Water-cooled reactor nuclear power plants, such as pressurised water reactor (PWR)) plants, include a reactor pressure vessel (RPV), which contains the reactor core/fuel assemblies, and a turbine for generating electricity from steam produced by heat from the fuel assemblies.

PWR plants have a pressurised primary coolant circuit which flows through the RPV and transfers heat energy to one or more steam generators (heat exchangers) within a secondary circuit. The (lower pressure) secondary circuit comprises a steam turbine which drives a generator for the production of electricity. These components of a nuclear plant are conventionally housed in an airtight containment building, which may be in the form of a concrete structure.

The RPV typically comprises a body defining a cavity for containing the reactor core/fuel assemblies and a closure head for closing an upper opening to the cavity. The closure head may form part of an integrated head package (IHP) (or integrated head assembly) which further comprises a control rod drive mechanism contained within a shroud. The control rod drive mechanism comprises drive rods which pass through the closure head and are connected to control rods contained within the reactor core. The control rods are provided to absorb neutron radiation within the core and thus control the nuclear reactions within the reactor core. The drive rods within the control rod drive mechanism are powered by a power supply to vertically translate to thus raise and lower the control rods within the reactor core.

Maintenance and refuelling is an important part of the operation of a nuclear power generation system. Maintenance is required periodically e.g. to replace old and/or damaged parts of the system. Refuelling is required periodically (e.g. every 18-24 months) in order to replace spent fuel rods within the fuel assemblies.

When performing maintenance/refuelling of the reactor core, it is necessary to remove the IHP from the RPV, thereby revealing the reactor core.

In order to perform maintenance and refuelling operations in a nuclear power generation system, an overhead crane arrangement such as a polar gantry crane having a circular runway is typically provided within the containment structure of the system. Polar cranes are necessarily large, heavy structures in order to allow the lifting of the heavy components of the nuclear power generation system. This makes polar cranes expensive to install.

During refuelling, the polar crane typically lifts the IHP from the RPV body vertically upwards, moves the IHP horizontally away from the RPV body and then lowers it onto a storage stand on the working floor within the containment building. The IHP typically comprises a lift frame having an uppermost shackle for connection to the winch of the polar crane.

During removal of the IHP from the reactor vessel body, the drive rods remain connected to the control rods but are disconnected from their associated power supply within the IHP. As a result, during removal of the IHP, the drive rods disengage from the IHP and remain protruding from the reactor vessel cavity into a refuelling cavity that is flooded with water to contain any radioactive emissions from the drive rods.

The protruding drive rods and the vertical extent of the refuelling cavity drives the necessary lift height of the IHP by the polar crane as the IHP has to clear the vertical height of the drive rods/refuelling cavity before being moved horizontally and lowered to the storage stand.

The necessary lift height of the polar crane dictates the height of containment structure (and thus the cost/time associated with the building of the containment structure).

There is a need for an improved nuclear power generation system which mitigates at least some of the problems associated with the known systems.

SUMMARY OF DISCLOSURE

In a first aspect, there is provided an integrated head package for a nuclear power generation system, the integrated head package comprising a closure head, and a control rod drive mechanism housed within a shroud, the control rod drive mechanism comprising at least one drive rod extending through the closure head and having a coupling element for releasably coupling to a control rod assembly within a reactor core, the at least one drive rod being movable to a maintenance/refuelling position in which the at least one drive rod is uncoupled from the control rod assembly and at least partially retracted into the integrated head package, the integrated head package further comprising at least one engagement feature for securing the at least one drive rod in the maintenance/refuelling position.

By providing an integrated head package (IHP) having drive rods that can be decoupled from the control rod assembles and locked into a retracted maintenance/refuelling position within the IHP for maintenance/refuelling, the drive rods can be removed from the reactor core along with the IHP. In this way, the lifting height of the IHP is reduced for a number of reasons. Firstly, the IHP does not need to be lifted above drive rods protruding from the reactor core before being moved horizontally to a storage position. Secondly, the need for a flooded refuelling cavity is removed as there will be no radioactive drive rods left protruding from the reactor core. In addition to reducing the necessary vertical lift height, elimination of the refuelling cavity also reduces the cost of the containment build.

Optional features of the present disclosure will now be set out. These are applicable singly or in any combination with any aspect of the present disclosure.

In preferred embodiments, the at least one drive rod is fully retracted within the IHP in the maintenance/refuelling position e.g. it/they may be fully retracted into the shroud of the IHP.

In some embodiments, the coupling element may be adjustable between a radially expanded and a radially contracted configuration. For example, the coupling element may comprise a plate (e.g. a circular plate) divided into sectors wherein the plate sectors are movable radially outwards away from each other to increase the radius of the coupling element and radially inwards towards each other to decrease the radius of the coupling element.

In preferred embodiments, the coupling element is biased towards a radially expanded rest configuration e.g. the plate sectors are biased away from one another.

When coupled to the control rod assembly within a reactor core, the radially expanded coupling element (e.g. the radially separated plate sectors) may be received in a recess (e.g. an annular recess) on the control rod assembly.

The engagement feature on the IHP for engaging the at least one drive rod in the maintenance/refuelling position may comprise an engagement recess e.g. an annular engagement recess. In the maintenance/refuelling position, the radially expanded coupling element (e.g. the radially separated plate sectors) may be received in the engagement recess on the control rod assembly.

The coupling element may be moveable between its radially expanded configuration and its radially contracted configuration by a pneumatic, hydraulic, mechanical or electromagnetic/electro-mechanical actuator. The coupling element may be actuable by a control system located remotely from the IHP.

The actuator may be configured to apply a force (e.g. pneumatic force) to move the coupling element from its radially expanded configuration to its radially retracted configuration (i.e. in the absence of a force applied by the actuator, the coupling element is preferably in its radially expanded rest configuration). Thus the actuator can apply a force (e.g. a pneumatic force) to move the coupling element (e.g. the sector plates) into the radially contracted configuration so that the coupling element can be decoupled from the control rod assembly and the drive rod can be retracted into the IHP. Once within the IHP, the actuator can cease to act (e.g. remove/reduce the pneumatic pressure) so that the coupling element (e.g. plate sectors) can return to the expanded (rest) configuration within the engagement recess to maintain the drive rod within the IHP.

In embodiments where the actuator is a hydraulic actuator, hydraulic force/pressure is used to force the coupling element (e.g. the plate sectors) into the radially contracted configuration. The hydraulic actuator may be controlled by reactor pressure transients. In some embodiments, the IHP may comprise a control rod drive mechanism liquid cooling circuit and the hydraulic actuator may be controlled using this control rod drive mechanism liquid cooling circuit.

In alternative embodiments, the engagement feature may comprise jaws e.g. provided in the control rod drive mechanism which engage the drive rod upon application of a force (e.g. a pneumatic force) in the maintenance/re-fuelling position.

In some embodiments, the coupling element may comprise a male bayonet fitting i.e. with at least one e.g. a plurality of lugs which are mechanically secured (through a vertical push and rotational twist motion effected by a mechanical actuator) within a female bayonet mount on the control rod assembly. In these embodiments, the engagement feature on the IHP for engaging the drive rod within the IHP may be a female bayonet mount.

In some embodiments, the IHP e.g. the control rod drive mechanism may comprise one or more sensors for confirming decoupling of the at least one drive rod from the associated control rod assembly. For example, the IHP (e.g. the control rod drive mechanism) may comprise at least one load sensor to detect the load on the control rod drive mechanism as the at least one drive rod is moved to its retracted maintenance/refuelling position within the IHP. Where the load is greater than expected (i.e. the load exceeds the expected weight of the drive rod), the at least one load sensor can provide a signal (e.g. to the control system) to indicate that decoupling has failed. If the load is as expected, the at least one load sensor can provide a signal to indicate that decoupling has occurred successfully.

Additionally/alternatively, the IHP (e.g. the control rod drive mechanism) may comprise at least one velocity sensor to measure velocity of the at least one drive rod. If velocity is reduced below an expected velocity (for the applied power) as the at least one drive rod is moved to its retracted maintenance/refuelling position within the IHP, the at least one velocity sensor can provide a signal (to the control system) to indicate that decoupling has failed. If the velocity is as expected, the at least one velocity sensor can provide a signal to indicate that decoupling has occurred successfully.

In some embodiments, the shroud is a radiation shielding shroud for containing emissions from the retracted at least one drive rod. The shroud may comprise at least one access hatch for access to the control rod drive mechanism.

The IHP may further comprise a lifting rig. This may be mounted at an upper axial end of the IHP (axially opposed to the closure head) for lifting the IHP from above e.g. by a polar crane. Alternatively, a lifting structure may be mounted proximal the closure head for lifting the IHP from below the upper axial end. The lifting structure may comprise an annular or radially/laterally extending element/flange/plate having an underside for engagement with a lifting device.

The closure head may comprise a fixing flange e.g. an annular fixing flange around the closure head for fixing to a complementary flange on a reactor vessel body having a cavity housing the reactor core. The flanges may have aligned stud holes for receiving fixing studs therethrough.

The shroud may be at least partly circumscribed by a rail or track e.g. a monorail having a hoist. The hoist may be provided for rotatably supporting a stud tensioner for tensioning studs within the aligned stud holes in the fixing flanges.

In some embodiments, the IHP further comprises a seismic support to dampen any horizontal movement of the control rod drive mechanism.

In some embodiments, the IHP further comprises a cooling circuit for cooling the control rod drive mechanism within the shroud. In some embodiments, the cooling circuit comprises cooling ducts in heat exchange relationship with the control rod drive mechanism, the cooling ducts for carrying cooling fluid which may be cooling air or cooling liquid (for example cooling water).

In some embodiments, the control rod drive mechanism comprises a plurality of drive rods and a plurality of engagement features, each drive rod having a respective coupling element for coupling to a control rod assembly and for engagement by a respective one of the engagement features when the drive rod is in its retracted maintenance/refuelling position.

In a second aspect, there is provided a nuclear power generation system comprising a reactor vessel having a reactor vessel body defining a cavity housing a reactor core containing a control rod assembly and an IHP according to the first aspect wherein the closure head of the IHP is configured to seal against the reactor vessel body.

In some embodiments, the control rod assembly comprises a recess (e.g. an annular recess) for coupling with the coupling element when in its radially expanded configuration.

In other embodiments, the control rod assembly may comprise a female bayonet mount for receiving the male bayonet coupling element of the drive rod.

In some embodiments, the system further comprises at least one neutronic sensor to monitor the level of neutron radiation within the reactor core. If the level of neutron radiation exceeds an expected level as the drive rod(s) is/are moved to its/their retracted maintenance/refuelling position within the IHP, the neutronic sensor can provide a signal (to the control system) to indicate that decoupling has failed (as the control rod assembly will be retracted along with the drive rod(s)). If the level of neutron radiation is as expected, the neutronic sensor can provide a signal to indicate that decoupling has occurred successfully.

Additionally/alternatively, the system may comprise one or both of an optical position sensor or an electrical position sensor to monitor control rod assembly position to ensure successful decoupling as the drive rod(s) is/are moved to its/their retracted maintenance/refuelling position within the IHP.

In some embodiments, the system comprises a control system for sending control signals for actuation of the control rod drive mechanism and/or actuation of the coupling element and/or actuation of the locking element. The control system may also be configured to receive output signals from the load and/or velocity sensor(s) within the IHP and/or the neutronic and/or position sensor(s) within the reactor core. The control system (and any associated user interface) may be remote from the reactor vessel.

In some embodiments, the system further comprises a cable manifold connected to a power supply and/or to the control system with one or more cables extending from the cable manifold to a connection terminal on the IHP. The one or more cables may be unreleasably connected to the connection terminal. The one or more cables may be movable between an elongated configuration when the closure head of the IHP is sealed against the reactor vessel body to a retracted e.g. a concertinaed configuration when the IHP is moved out of vertical alignment with the reactor vessel body.

In a third aspect, there is provided a method of exposing a reactor core within a nuclear power generation system according to the second aspect (e.g. for maintenance and/or refuelling) by decoupling the at least one drive rod from the control rod assembly, at least partly retracting the at least one drive rod into the integrated head package, securing the at least one drive rod in the retracted maintenance/refuelling position and removing the integrated head package from the reactor vessel body.

In some embodiments, the method comprises remotely decoupling the or each drive rod from the control rod assembly (e.g. by input at the user interface of the remote control system).

In some embodiments, the method comprises decoupling the or each drive rod by applying a force to the coupling element. For example, the method may comprise applying a pneumatic, hydraulic, mechanical or electro-mechanical force to the coupling element e.g. to reduce the radial expansion of the coupling element.

In some embodiments, the method comprises fully retracting the or each drive rod within the IHP (e.g. within the shroud) prior to removing the IHP from the reactor vessel body.

In some embodiments where the control rod drive mechanism has a plurality of drive rods, the method comprises non-simultaneous decoupling and retracting of the plurality of drive rods. For example, the method may comprise decoupling and retracting a first batch of non-adjacent drive rods followed by decoupling and retracting a second batch of non-adjacent drive rods.

In some embodiments, the method comprises confirming decoupling of the or each drive rod from the associated control rod assembly using one or more sensors. For example, the method may comprise detecting the load on the control rod drive mechanism using a load sensor as the drive rod is moved to its retracted maintenance/refuelling position within the IHP. Where the load is greater than expected (i.e. the load exceeds the expected weight of the drive rod), the load sensor sends a signal (e.g. to the control system) to indicate that decoupling has failed. If the load is as expected, the load sensor sends a signal to indicate that decoupling has occurred successfully.

Additionally/alternatively, method may comprise measuring the velocity of the or each drive rod using a velocity sensor. If velocity is reduced below an expected velocity (for the applied power) as the drive rod is moved to its retracted maintenance/refuelling position within the IHP, the velocity sensor sends a signal (to the control system) to indicate that decoupling has failed. If the velocity is as expected, the velocity sensor sends a signal to indicate that decoupling has occurred successfully.

Additionally/alternatively, the method comprises monitoring the level of neutron radiation within the reactor core using a neutronic sensor. If the level of neutron radiation exceeds an expected level as the drive rod is moved to its retracted maintenance/refuelling position within the IHP, the neutronic sensor sends a signal (to the control system) to indicate that decoupling has failed (as the control rod assembly will be retracted along with the drive rod). If the level of neutron radiation is as expected, the neutronic sensor sends a signal to indicate that decoupling has occurred successfully.

Additionally/alternatively, the method may comprise monitoring the position of the control rod assembly using one or both of an optical position sensor or an electrical position sensor to ensure successful decoupling as the at least one drive rod is moved to its retracted maintenance/refuelling position within the IHP.

In some embodiments, the method may comprise simultaneously detecting the load on the control rod drive mechanism, the velocity of the retracting drive rod(s) and the level of neutron radiation within the reactor core to ensure effective decoupling of the or each drive rod.

In some embodiments where the IHP closure head comprise a fixing flange e.g. an annular fixing flange for fixing to the complementary flange on the reactor vessel body, the flanges comprising aligned stud holes with fixing studs therethrough and where the shroud is at least partly circumscribed by a rail or track having a hoist, the method comprises, attaching a stud tensioner to the rail, moving the stud tensioner (e.g. by circumferential and/or vertical movement) to engage with the fixing studs and removing the studs.

The method may further comprise lifting the IHP vertically from above (e.g. using a polar crane). Alternatively, the method may comprise lifting the IHP from below a lifting structure mounted proximal the closure head.

The method may comprise lifting the IHP (from either above or below) by less than 1 m e.g. less than 50 cm such as less than 10 cm or less than 3 cm and then moving it horizontally out of alignment with the reactor vessel body.

In some embodiments, the method comprises retaining the connection between the cable manifold connected to the power supply and/or to the control system and the connection terminal on the IHP during lifting and horizontal movement of the IHP by moving cables extending between the cable manifold and connection terminal between an elongated configuration when the closure head of the IHP is sealed against the reactor vessel body to a retracted e.g. a concertinaed configuration when the IHP is moved out of vertical alignment with the reactor vessel body.

The present invention may comprise, be comprised as part of a nuclear reactor power plant, or be used with a nuclear reactor power plant (referred to herein as a nuclear reactor). In particular, the present invention may relate to a Pressurized water reactor. The nuclear reactor power plant may have a power output between 250 and 600 MW or between 300 and 550 MW.

The nuclear reactor power plant may be a modular reactor. A modular reactor may be considered as a reactor comprised of a number of modules that are manufactured off site (e.g. in a factory) and then the modules are assembled into a nuclear reactor power plant on site by connecting the modules together. Any of the primary, secondary and/or tertiary circuits may be formed in a modular construction.

The nuclear reactor may comprise a primary circuit comprising a reactor pressure vessel; one or more steam generators and one or more pressurizer. The primary circuit circulates a medium (e.g. water) through the reactor pressure vessel to extract heat generated by nuclear fission in the core, the heat is then to delivered to the steam generators and transferred to the secondary circuit. The primary circuit may comprise between one and six steam generators; or between two and four steam generators; or may comprise three steam generators; or a range of any of the aforesaid numerical values. The primary circuit may comprise one; two; or more than two pressurizers. The primary circuit may comprise a circuit extending from the reactor pressure vessel to each of the steam generators, the circuits may carry hot medium to the steam generator from the reactor pressure vessel, and carry cooled medium from the steam generators back to the reactor pressure vessel. The medium may be circulated by one or more pumps. In some embodiments, the primary circuit may comprise one or two pumps per steam generator in the primary circuit.

In some embodiments, the medium circulated in the primary circuit may comprise water. In some embodiments, the medium may comprise a neutron absorbing substance added to the medium (e.g., boron, gadolinium). In some embodiments the pressure in the primary circuit may be at least 50, 80 100 or 150 bar during full power operations, and pressure may reach 100, 150 or 180 bar during full power operations. In some embodiments, where water is the medium of the primary circuit, the heated water temperature of water leaving the reactor pressure vessel may be between 540 and 670 K, or between 560 and 650 K, or between 580 and 630 K during full power operations. In some embodiments, where water is the medium of the primary circuit, the cooled water temperature of water returning to the reactor pressure vessel may be between 510 and 600 k, or between 530 and 580 K during full power operations.

The nuclear reactor may comprise a secondary circuit comprising circulating loops of water which extract heat from the primary circuit in the steam generators to convert water to steam to drive turbines. In embodiments, the secondary loop may comprise one or two high pressure turbines and one or two low pressure turbines.

The secondary circuit may comprise a heat exchanger to condense steam to water as it is returned to the steam generator. The heat exchanger may be connected to a tertiary loop which may comprise a large body of water to act as a heat sink.

The reactor vessel may comprise a steel pressure vessel, the pressure vessel may be from 5 to 15 m high, or from 9.5 to 11.5 m high and the diameter may be between 2 and 7 m, or between 3 and 6 m, or between 4 to 5 m. The pressure vessel may comprise a reactor body and a reactor head positioned vertically above the reactor body. The reactor head may be connected to the reactor body by a series of studs that pass through a flange on the reactor head and a corresponding flange on the reactor body.

The reactor head may comprise an integrated head assembly in which a number of elements of the reactor structure may be consolidated into a single element. Included among the consolidated elements are a pressure vessel head, a cooling shroud, control rod drive mechanisms, a missile shield, a lifting rig, a hoist assembly, and a cable tray assembly.

The nuclear core may be comprised of a number of fuel assemblies, with the fuel assemblies containing fuel rods. The fuel rods may be formed of pellets of fissile material. The fuel assemblies may also include space for control rods. For example, the fuel assembly may provide a housing for a 17×17 grid of rods i.e. 289 total spaces. Of these 289 total spaces, 24 may be reserved for the control rods for the reactor, each of which may be formed of 24 control rodlets connected to a main arm, and one may be reserved for an instrumentation tube. The control rods are movable in and out of the core to provide control of the fission process undergone by the fuel, by absorbing neutrons released during nuclear fission. The reactor core may comprise between 100-300 fuel assemblies. Fully inserting the control rods may typically lead to a subcritical state in which the reactor is shutdown. Up to 100% of fuel assemblies in the reactor core may contain control rods.

Movement of the control rod may be moved by a control rod drive mechanism. The control rod drive mechanism may command and power actuators to lower and raise the control rods in and out of the fuel assembly, and to hold the position of the control rods relative to the core. The control rod drive mechanism rods may be able to rapidly insert the control rods to quickly shut down (i.e. scram) the reactor.

The primary circuit may be housed within a containment structure to retain steam from the primary circuit in the event of an accident. The containment may be between 15 and 60 m in diameter, or between 30 and 50 m in diameter. The containment structure may be formed from steel or concrete, or concrete lined with steel. The containment may contain within or support exterior to, a water tank for emergency cooling of the reactor. The containment may contain equipment and facilities to allow for refuelling of the reactor, for the storage of fuel assemblies and transportation of fuel assemblies between the inside and outside of the containment.

The power plant may contain one or more civil structures to protect reactor elements from external hazards (e.g. missile strike) and natural hazards (e.g. tsunami). The civil structures may be made from steel, or concrete, or a combination of both.

BRIEF DESCRIPTION OF THE DRAWINGS

Embodiments will now be described by way of example only with reference to the accompanying drawings in which.

DETAILED DESCRIPTION AND FURTHER OPTIONAL FEATURES

Figure 1:
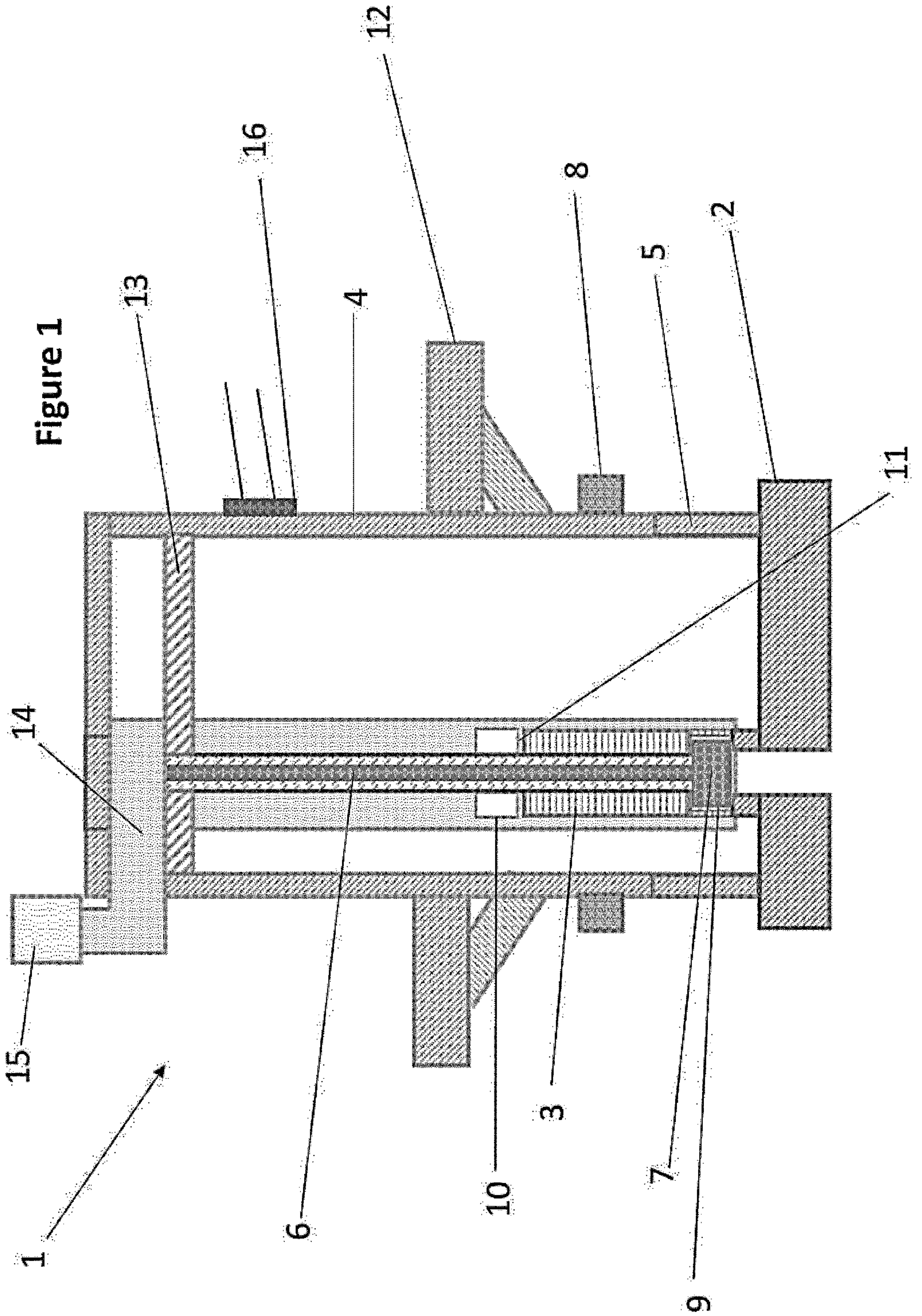
FIG. 1 shows a schematic cross section through an integrated head package.

FIG. 1 shows a schematic cross section through an integrated head package (IHP) 1 for a nuclear power generation system. The IHP 1 comprises a closure head 2, and a control rod drive mechanism 3 housed within a shroud 4. The shroud 4 is a radiation shielding shroud and comprises at least one access hatch 5 for access to the control rod drive mechanism 3.

The control rod drive mechanism 3 includes a drive rod 6 which can extend and retract through the closure head 2. For simplicity, only a single drive rod 6 is shown (and displayed larger than to scale) but the control drive mechanism will comprise a plurality of drive rods 6.

At the axially lower end of the drive rod 6, there is a coupling element 7 for releasably coupling to a control rod assembly within a reactor core (not shown). The coupling element 7 comprises two semi-circular sector plates which are spaced from one another in a radially expanded rest configuration. The radially expanded coupling element 7 is engaged within an annular engagement recess 9 to maintain the drive rod 6 within the IHP.

The reactor core is contained within a cavity defined by a reactor vessel body. The reactor vessel body has an upper end that is sealed by the closure head 2 of the IHP 1.

The closure head 2 and the upper end of the reactor vessel body both have complementary fixing flanges (not shown) having aligned though-holes housing tensioned studs that seal the IHP to the reactor vessel body.

When the IHP 1 is sealed to the reactor vessel body, the radially expanded coupling element 7 is housed within a recess in the control rod drive assembly within the reactor core so that as the drive rod 6 is translated, the extent of the control rod assembly within the reactor core is vertically adjusted so as to adjust the amount of neutron radiation absorption thus controlling the nuclear reactions within the reactor core.

The IHP 1 further comprises a seismic support 13 to dampen any horizontal movement of the control rod drive mechanism 3/drive rods 6 and a cooling circuit comprising a cooling air duct 14 and a fan 15 for cooling the interior of the IHP 1/shroud 4.

When it becomes necessary to expose the reactor core (e.g. for maintenance or refuelling), it is first necessary to de-tension the studs in the fixing flanges. This is effected by mounting a stud tensioner device on a monorail 8 which circumscribes the shroud 4. The stud tensioner device is lowered to engage, de-tension and remove the studs.

Next the drive rod 6 is disengaged from the control rod assembly by applying pneumatic pressure using a pneumatic actuator (not shown) at the coupling element 7 to force the sector plates towards each other so as to move the coupling element 7 to a radially contracted configuration so that it disengages from the recess on the control rod assembly. This decoupling can be effected remotely at a user interface of a remote control system thus eliminating the need for any manual intervention.

The drive rod 6 is then retracted into a maintenance/refuelling position where it is fully enclosed within the shroud 4 as shown in FIG. 1. The IHP comprises an engagement recess 9 which engages with the radially expanded coupling element 7 once the pneumatic pressure is removed and secures the drive rod 6 in its retracted position.

The IHP 1 further comprises a load sensor 10 to detect the load on the control rod drive mechanism as the drive rod 6 is moved to its retracted maintenance/refuelling position within the IHP shroud 4. If the load exceeds the expected load (i.e. exceeds the weight of the drive rod 6), this indicates that the decoupling has failed and a signal can be sent from the load sensor 10 to the remote control system to prevent any lifting of the IHP 1. If the load is as expected, the load sensor 10 can provide a signal to indicate that decoupling has occurred successfully and lifting can proceed.

The IHP 1 further comprises a velocity sensor 11 to measure velocity of the drive rod 6. If velocity is reduced below an expected velocity (for the applied power) as the drive rod 6 is moved to its retracted maintenance/refuelling position within the IHP shroud 4 (because the movement is impeded by a connection to the control rod assembly), the velocity sensor 11 can provide a signal (to the control system) to indicate that decoupling has failed and lifting of the IHP 1 cannot proceed. If the velocity is as expected, the velocity sensor 11 can provide a signal to indicate that decoupling has occurred successfully.

In addition to the load sensor 10 and the velocity sensor 11, the reactor core may also comprise a neutronic sensor and a control rod position sensor (not shown) to also detect any failure in decoupling.

The decoupling of the drive rods 6 occurs in batches with a first batch of non-adjacent drive rods being decoupled and retracted prior to a second batch of non-adjacent drive rods 6.

Once all drive rods 6 are decoupled and retracted into the IHP 1, the IHP 1 can be lifted so that the closure head 2 no longer seals the reactor core.

The IHP further comprises a lifting structure 12 which, in this embodiment can be attached to a hoist of an overhead crane (not shown) to raise the IHP 1 vertically or from a lifting device positioned below the lifting structure. Because the drive rods 6 are entirely enclosed within the IHP 1 and thus there is no need for a refuelling cavity, the IHP need only be lifted vertically between 100 and 300 mm before being moved horizontally and lowered to the storage stand.

Figure 2A:
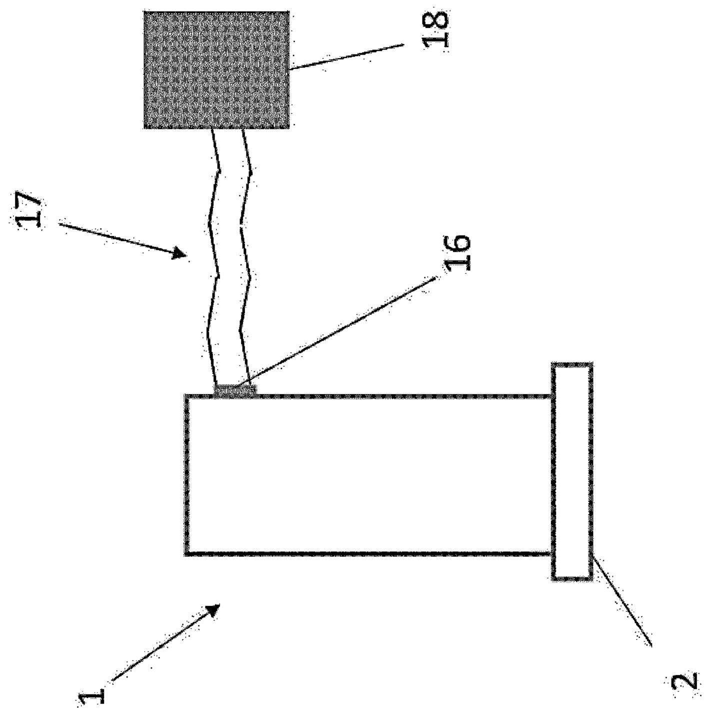
FIGS. 2*a* and 2*b* show an integrated head package with cables.
Figure 2B:
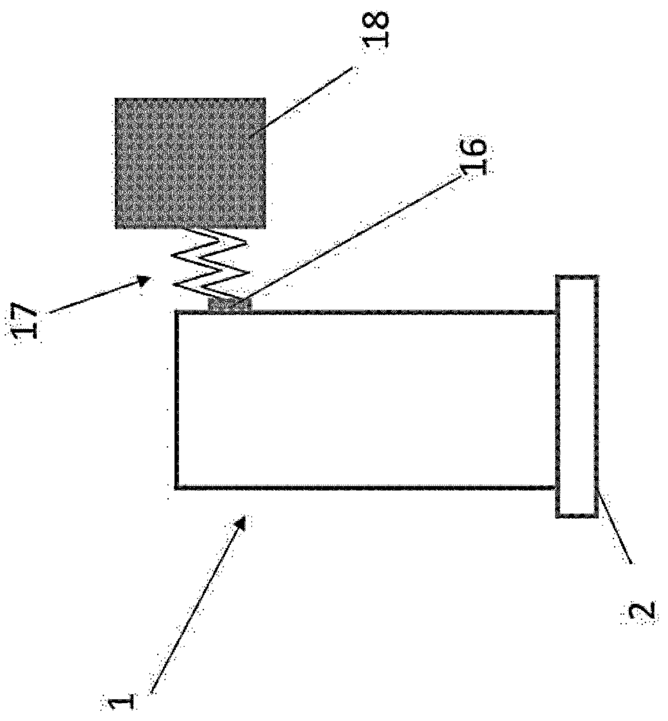

The IHP further comprises a connection terminal 16 for the connection of cables 17 extending to a cable manifold 18 in connection with the power supply and/or to the control system. The cables 17 are unreleasably connected to the connection terminal. The cables 17 may be movable between an elongated configuration (shown in FIG. 2*a*) when the closure head 2 of the IHP 1 is sealed against the reactor vessel body to a retracted e.g. a concertinaed configuration (shown in FIG. 2*b*) when the IHP 1 is moved out of vertical alignment with the reactor vessel body.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. An integrated head package for a nuclear power generation system, the integrated head package comprising:

a closure head;

a control rod drive mechanism housed within a shroud, the control rod drive mechanism comprising:

at least one drive rod extendable through the closure head and having a coupling element for releasably coupling to a control rod assembly within a reactor core, the at least one drive rod being movable to a maintenance/refuelling position in which the at least one drive rod is uncoupled from the control rod assembly and fully retracted into the shroud; and at least one engagement feature for securing the at least one drive rod in the maintenance/refuelling position.

2. The integrated head package according to claim 1 wherein the coupling element is configured to have a radially expanded rest configuration and is moveable by an actuator to a radially contracted configuration for retraction into the shroud.

3. The integrated head package according to claim 1 wherein the coupling element is actuable by a pneumatic, hydraulic, electro-mechanical or mechanical actuator.

4. The integrated head package according claim 1 further comprising one or more sensors for confirming decoupling of the at least one drive rod.

5. The integrated head package according to claim 4 wherein the one or more sensors comprises a load sensor and/or a velocity sensor.

6. The integrated head package according to claim 1 wherein the at least one engagement feature comprises a recess for engaging the coupling element within the integrated head package to secure the at least one drive rod in its retracted maintenance/refuelling position.

7. A nuclear power generation system comprising:

a reactor vessel having a reactor vessel body defining a cavity housing a reactor core;

a control rod assembly contained within the reactor core; and an integrated head package comprising:

a closure head configured to seal against the reactor vessel body;

a control rod drive mechanism housed within a shroud, the control rod drive mechanism comprising:

at least one drive rod extendable through the closure head and having a coupling element for releasably coupling to the control rod assembly, the at least one drive rod being movable to a maintenance/refuelling position in which the at least one drive rod is uncoupled from the control rod assembly and fully retracted into the shroud, and at least one engagement feature for securing the at least one drive rod in the maintenance/refuelling position.

8. The nuclear power generation system according to claim 7 further comprising at least one neutronic sensor to monitor the level of neutron radiation within the reactor core.

9. The nuclear power generation system according to claim 7 further comprising one or both of an optical position sensor and/or an electrical position sensor to monitor control rod assembly position.

10. The nuclear power generation system according to claim 7 further comprising a control system for sending control signals and receiving sensor output signals, the control system being remote from the reactor vessel.

11. The nuclear power generation system according to claim 7 further comprising a cable manifold with one or more cables extending from the cable manifold to a connection terminal on the integrated head package, the one or more cables being movable between an elongated configuration when the closure head of the integrated head package is sealed against the reactor vessel body to a retracted configuration when the integrated head package is moved out of vertical alignment with the reactor vessel body.

12. A method of exposing a reactor core within a nuclear power generation system according to claim 7 by decoupling the at least one drive rod from the control rod assembly, fully retracting the at least one drive rod into the integrated head package, securing the at least one drive rod in the retracted maintenance/refuelling position and removing the integrated head package from the reactor vessel body.

13. The method according to claim 12 wherein decoupling the at least one drive rod from the control rod assembly further includes remotely decoupling the at least one drive rod from the control rod assembly.

14. The method according to claim 12 wherein the control rod drive mechanism comprises a plurality of drive rods, and wherein decoupling the at least one drive rod from the control rod assembly and fully retracting the at least one drive rod into the integrated head package occur non-simultaneously.

15. The method according to claim 14 wherein decoupling the at least one drive rod from the control rod assembly and fully retracting the at least one drive rod into the integrated head package further includes decoupling and retracting a first batch of non-adjacent drive rods of the plurality of drive rods followed by decoupling and retracting a second batch of non-adjacent drive rods of the plurality of drive rods.

16. The method according to claim 12 further comprising confirming decoupling of the or each drive rod from the control rod assembly using one or more of a load sensor, a velocity sensor, a neutronic sensor and/or a position sensor.

17. The method according to claim 13 further comprising lifting the integrated head package a lifting device positioned below a lifting structure mounted on the shroud above the closure head.

18. The method according to claim 12 further comprising lifting the integrated head package by less than 10 cm and then moving it horizontally out of alignment with the reactor vessel body.

* * * * *